United States Patent [19]

Tournier et al.

[11] 3,833,890

[45] Sept. 3, 1974

[54] SAFETY DEVICE

[75] Inventors: Christian Yves Tournier, Paris; Jean Marie C. S. Buzy-Debat, Ville D'Avray, both of France

[73] Assignee: International Standard Electric Corporation, New York, N.Y.

[22] Filed: Mar. 14, 1973

[21] Appl. No.: 341,183

[30] Foreign Application Priority Data

Mar. 17, 1972 France .............................. 72.09415

[52] U.S. Cl. .............................................. 340/172.5

[51] Int. Cl. .......................... G06f 11/06, G05b 9/02

[58] Field of Search ................ 340/172.5, 146.1 BE; 235/153 AE, 153 BN

[56] References Cited

UNITED STATES PATENTS

| | | | |
|---|---|---|---|
| 3,252,149 | 5/1966 | Weida et al. | 340/172.5 |
| 3,303,474 | 2/1967 | Moore et al. | 340/172.5 |
| 3,471,686 | 10/1969 | Connell | 235/153 |
| 3,517,174 | 6/1970 | Ossfeldt | 235/153 |
| 3,562,716 | 2/1971 | Fontaine et al. | 340/172.5 |
| 3,587,058 | 6/1971 | Butler et al. | 340/172.5 |
| 3,654,603 | 4/1972 | Gunning | 340/146.1 |
| 3,693,161 | 9/1972 | Price | 340/172.5 |
| 3,711,835 | 1/1973 | Jaeger et al. | 340/172.5 |
| 3,716,837 | 2/1973 | Waddell | 340/172.5 |

*Primary Examiner*—Raulfe B. Zache
*Assistant Examiner*—James D. Thomas
*Attorney, Agent, or Firm*—John T. O'Halloran; Menotti J. Lombardi, Jr.; Alfred C. Hill

[57] ABSTRACT

A safety arrangement that avoids double access from paired duplicated circuits to commonly controlled equipment. The safety arrangement includes two safety circuits each associated with one of the duplicated circuits. Each of the safety circuits comprising a seizure bistable circuit whose output is connected to a priority arrangement. The output of the priority arrangement is connected to an operation bistable circuit. The priority arrangement is driven by one of two synchronized oscillators one in each safety circuit associated with duplicated circuit, the two oscillators operating in phase opposition.

6 Claims, 2 Drawing Figures

SAFETY DEVICE

BACKGROUND OF THE INVENTION

The present invention relates to a safety arrangement making it possible to control access from two duplicated items to the same equipment in a system managed, on a real-time basis, by two duplicated chains including the two accessing duplicated items, each chain including among the duplicated items a computer operating on a basis of load sharing with a second chain computer.

In a known manner, in a real-time operating system such as, for instance, a common control telephone switching system using computers, it is necessary to duplicate the computers so as not to block system operation in case of failure in one of the computers. For the same reason, it is of interest to duplicate the important peripheral items utilized by computers for gathering data and performing orders.

These peripheral items are, for instance, in a telephone exchange those line and trunk scanners which operate for detecting new events and those distributors and markers which operate for changing switching network and trunk conditions.

Conversely, for obvious reasons, equipments controlled by duplicated items are not themselves duplicated, for instance, the telephone exchange switching network.

Therefore, there are conflicting conditions if two duplicated items have simultaneously access to the same equipment and that is true whatever the nature of the items are, that is whatever the duplicated items are, either two computers or two associated peripherals items belonging to distinct chains. As a result, simultaneous access to a same equipment is generally forbidden.

In a conventional manner, the two system computers are interconnected through a data transmission link which enables then to inform each other of the main operations that each one is processing in order, among other things, to enable each computer to become in charge of operations processed by the other computer in case of a failure in the other computer.

That data link may possibly settle problems of access between duplicated items, whether they are duplicated computers or peripheral items. However, this results in considerably complicated handling processes and particularly uses additional machine time for access problems.

As a result, when a system includes two identical control chains, each comprising a computer, plus subsidiary circuits and peripherals items associated with that computer, it appears to be of interest to provide, in the case of duplicated peripheral items, an interconnection link from duplicated peripherals to the common equipment so as to handle access problems at the level of those concerned peripheral items and, in the case of duplicated computers, an additional interconnection link associated with the concerned common equipment.

However, due to the fact that operation of the two duplicated items is determined by the so implemented link, it is necessary that unoperative condition in one item cannot result in blocking the other item to which it is linked, that would block a portion of the system, at least.

SUMMARY OF THE INVENTION

Thus, an abject of the present invention is to provide a safety arrangement for controlling access from duplicated items to one of those common equipments which are controlled by two duplicated chains, each chain including half of the duplicated items and comprising among those items a computer controlling the system through its chain and in conjunction with the other chain.

According to a feature of the present invention, the safety arrangement comprises, for each pair of duplicated items having access to the same commonly controlled equipment, a pair of interconnected safety circuits associated with that equipment, each interconnected safety circuit being associated with one duplicated item in the pair of duplicated items.

Each interconnected safety circuit includes a seizure bistable-type circuit for seizing the commonly controlled equipment, which is activated by the computer included in the same chain as the item associated with the interconnected safety circuit.

Each interconnected safety circuit also comprises a priority arrangement including an oscillator synchronized in phase opposition to the the oscillator of the other of the paired interconnected safety circuits.

Each interconnected safety circuit further comprises a logic-AND-type control circuit having one input connected to the seizure bistable circuit output and a second input connected to the priority arrangement output.

In addition, each interconnected safety circuit comprises a bistable-type operation circuit having its input connected to the output of the AND circuit and its output connected, via a complement-logic-type circuit, to a third input of the AND circuit of the other safety circuit, so as to prevent, when such an AND circuit is operative, the other paired interconnected safety circuit from having access to the commonly controlled equipment, by inhibiting the other AND circuit.

According to a feature of the invention, each interconnected safety circuit further comprises a monostable-type safety switch having an operation period $t$ and being usually cyclically made operative with a period T $< t$, in such a manner that, on the one hand, the link from the operation bistable circuit output to the to the complement-logic-type circuit of the other safety circuit, is interrupted and, on the other hand, the link from the priority arrangement to the priority arrangement of the other safety device is interrupted, if activation pulses are missing at its input for a time interval higher than t.

BRIEF DESCRIPTION OF THE DRAWING

Other features of this invention will appear more clearly from the following description of an embodiment, the description being made in conjunction with the accompanying drawings, wherein.

DESCRIPTION OF THE PREFERRED EMBODIMENT

Figure 1:
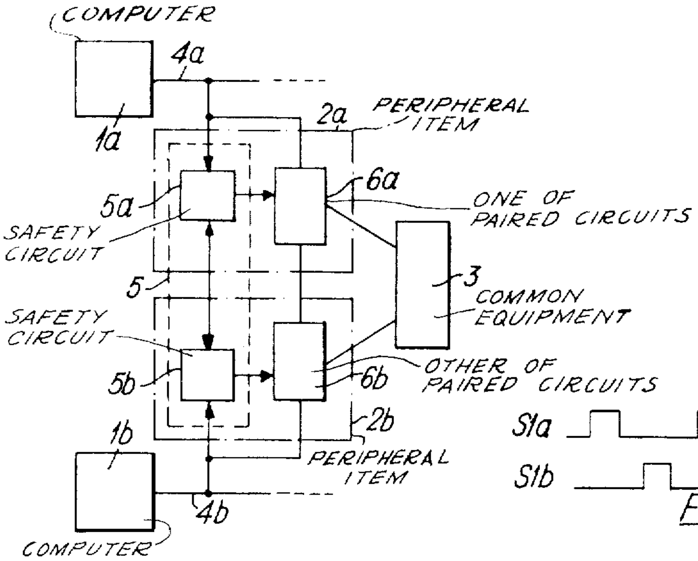
FIG. 1 is a block-diagram of the safety arrangement according to this invention, with respect to two duplicated items in a system controlled, on a real-time basis, by two duplicated chains, each chain including a computer among their items.

The system, as shown in FIG. 1, operates on a real-time basis under control of two chains, each chain including a computer and a set of peripherals. The peripheral items make it possible for data resulting from controlled equipment operation to be gathered and orders to be sent to such equipments as a function of gathered data and processing program.

Thus, each chain includes a computer 1, such as computer 1a in the first chain and computer 1*b* in the second chain, and a set of duplicated peripheral items among which only two items 2*a* and 2*b* have been shown, which are given the same functions with respect to the common equipment 3 in the system.

Duplicated peripheral items 2*a* and 2*b* are connected in parallel to various inputs and outputs of equipment 3, as a function of their predetermined assignment.

Each peripheral item is connected to the computer in its chain via a transmission link, such as link 4*a* between computer 1*a* and item 2*a* and such as link 4b between computer 1b and item 2*b*. In a conventional manner, such a link may be common to all peripheral items in a chain.

Each peripheral item, such as item 2*a*, includes a safety circuit of the safety arrangement in addition to its usual circuits shown in 6, such as 6*a* and 6*b*.

Each safety circuit, such as circuit 5*a* in peripheral item 2*a*, is connected to the paired circuit, such as circuit 5*b* in peripheral item 2*b*, so as to control acces from circuits 6 to equipment 3.

As a matter of fact, as a principle and for avoiding eventual conflicts, circuit 6a must not have an active relation with equipment 3 when circuit 6*b* is in an active relation with equipment 3.

Figure 2:
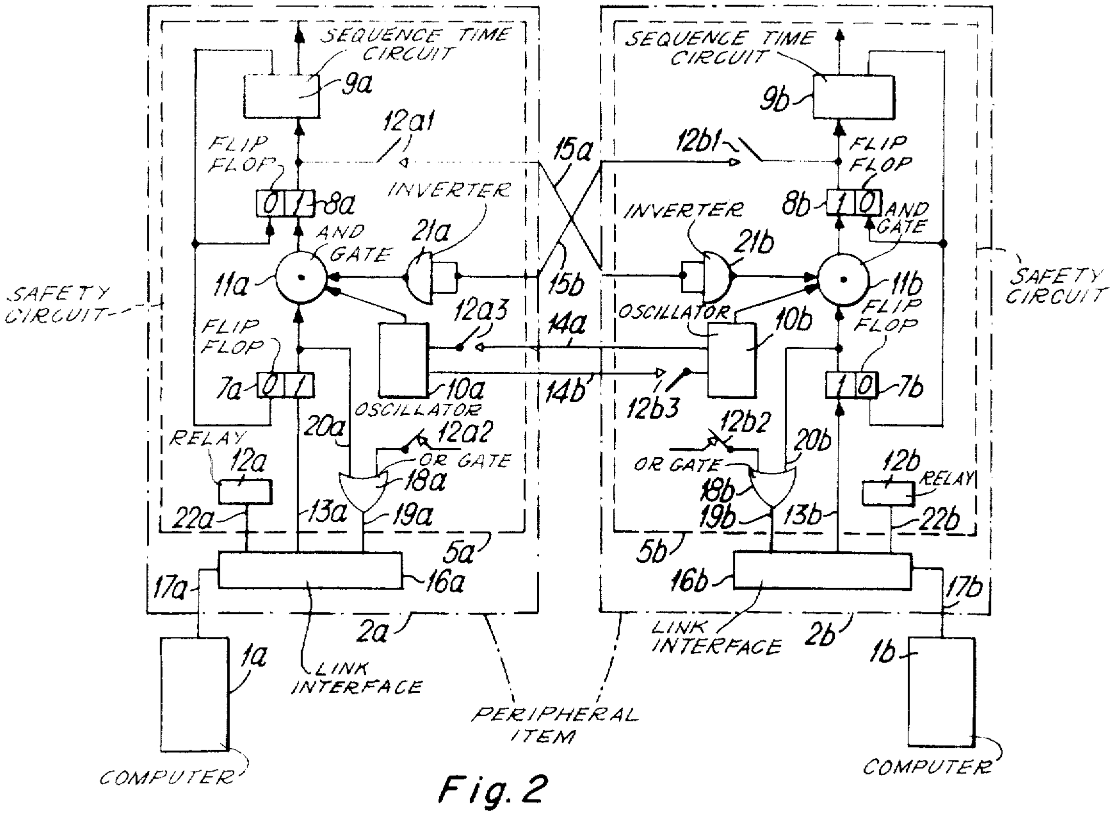
FIG. 2 is a detailed logic diagram of the safety arrangement of FIG. 1, without considering the nature of the concerned duplicated items.

Thus, safety circuits 5*a* and 5*b* of the safety arrangement are purposed for settling access problems according to principles which will be defined in a more precise manner in conjunction with FIG. 2, where, in a first phase, the description is more particularly related to the case of duplicated peripheral items rather than to the case of duplicated computers.

Basically, FIG. 2 includes the two computers 1*a* and 1*b*, and the safety circuits 5*a* and 5*b*. For clarification purpose, peripheral items 2*a* and 2*b* are not shown in FIG. 2, but their safety circuits 5*a* and 5*b* plus their link interfaces 16*a* and 16*b* associated with their respective computers as shown. Indeed, each computer 1 is connected to its associated peripheral item 2 through a set of transmission links which are shown at 17*a* and 17*b* respectively. Link interfaces 16*a* and 16*b* include a number of matching circuits for receiving and reshaping exchanged data.

Each safety circuit 5*a* or 5*b* first includes certain components, conventionally used with peripheral items such as a peripheral item seizure flip-flop 7*a* or 7*b*, an on-off operation flip-flop, 8*a* or 8*b*, and a sequence time circuit 9*a* or 9*b*.

In addition, each circuit 5*a* or 5*b* includes devices pertinent to the safety arrangement such as an oscillator 10*a* or 10*b*, a logic control circuit having an AND function 11*a* or 11*b*, and a relay 12*a* or 12*b*.

For providing operation safety, two duplicated peripheral items cannot have simultaneous access to that equipment that they can control. As a consequence, safety circuit 5 comprises an alternating priority circuit and a blocking circuit blocking an access requesting peripheral item by operative peripheral item.

For a peripheral item, an operation step necessarily begins by a seizure request from the peripheral item, such a request being controlled by the computer controlling such a peripheral item.

In FIG. 2, a computer, for instance computer 1*a*, performs that seizure by sending a bit 1 to the control input of the seizure flip-flop 7*a* in peripheral item 2*a*, through means located inside interface 16*a* and connected via link 13*a*.

There is a possibility that both computers 1*a* and 1*b* simultaneously perform operation of flip-flops 7*a* and 7*b* in their respective peripheral items 2*a* and 2*b*.

For avoiding a double acess, control of on-off flip-flops 8*a* and 8*b* are made through respective control circuits, control circuit 11*a* for flip-flop 8*a* and control circuit 11*b* for flip-flop 8*b*.

The output of one of the circuits 11*a* or 11*b* can only be present if oscillator 10 of the respective safety circuit applies a bit 1 to its associated control circuit input.

Figure 3:
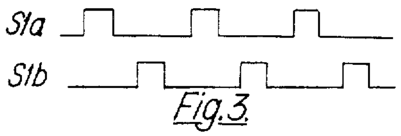
FIG. 3 is a diagram of the output of the two oscillators of the priority arrangement of FIG. 2.

The two oscillators 10*a* and 10*b* are synchronized in phase opposition via links 14*a* and 14*b* and on-contacts 12*a*3 and 12*b*3 in on conditions, so that their respective oscillator output signals S1*a* and S1*b* will never have the value "1" simultaneously (see FIG. 3).

Therefore, if both seizure flip-flops are simultaneously set in the binary condition "1", the peripheral which will actually be set into an operative condition will be that one to which the oscillator will first provide a signal of value "1".

Thus, such an arrangement ensures, in the above case, a random priority to the two duplicated peripheral items and, therefore, avoids any simultaneous double access from the two duplicated peripheral items to the single equipment that they are controlling.

For avoiding access from a peripheral item to its associated equipment, when the associated equipment is being handled by the other duplicated peripheral item, the thire input of control circuit 11 in the one peripheral is connected to the operation flip-flop output, such as flip-flop 8b, of the other duplicated peripheral item, via an inverter, such as inventer 21*b*, and vice versa for circuit 11*b* and flip-flop 8*a*.

When peripheral item 2*b* has been set in an operation condition, flip-flop 8b is in the "1" condition and inverter 21*a* provides an output signal of value "0". This binary "0" value, which is applied to the third input of circuit 11*a* through contact 12*b*1, which inhibits circuit 11*a* and prevents any triggering of peripheral item 2*a*.

Conversely, if peripheral item 2*b* is at rest, flip-flop 8*b* is reset in the "0" condition and inverter 21*a* delivers an output signal of value "1", which allows triggering of peripheral 2*a* to the extent that the two other inputs of circuit 11*a* are also activated.

Thus, a peripheral item, such as item 2*a*, is set in an operative condition by setting flip-flop 8*a* into the "1" condition due to an output signal from circuit 11*a*, that is produced when its three inputs are simultaneously activated. Flip-flop 8*a* activates sequence time circuit 9*a* in peripheral item 2*a*, circuit 9*a* being a monostable type device operating in a known manner.

At the end of its duty cycle, sequence time circuit, such as circuit 9*a*, resets flip-flops 7*a* and 8*a*, which allows the other duplicated peripheral item to operate, if requested.

However, when one of the peripheral items is operative, the priority to perform a next duty is automatically given to the other peripheral item up to the duty end of the first peripheral item, since during that time period, the seizure flip-flop 7 of the stand-by peripheral will be in the "1" condition at the reset time of the seizure flip-flop 7 in the presently operative peripheral item, so that necessarily the stand-by peripheral item is given the priority.

The structure of the previously described priority and exclusion system introduces links between the two system chains which could cause the two peripheral items will be blocked and then the system to be blocked in case of failure in one of the peripheral items, for instance, in case of non-reset of an operation flip-flop 8 or of failure in an oscillator.

For remedying the first drawback, the link, 15*a* or 15*b*, providing unoperative condition to the peripheral item asking for access due to the other peripheral item being in an operative condition, is controlled via a make contact 12*a*1 or 12*b*1, of a relay, 12*a* or 12*b*, respectively.

Relays 12*a* and 12*b* are respectively controlled by computers associated to their peripheral items as shown by links 22*a* and 22*b*.

Relays 12 are time delayed when reset to the rest condition and each have their control circuits supplied, via respective interfaces 16, with activation pulses delivered at a regular rate from their respective computers.

Contacts 12*a*1 and 12*b*1 of relays 12*a* and 12*b* are make-contacts. Each one controls the blocking link, such as link 15*a* for contact 12*a*1, from its peripheral item operation flip-flop 8, so as to make possible the blocking of the other peripheral item by inhibiting circuit 11 in this one, when it is itself operative, and by suppressing that possibility, when it is itself unoperative.

Contacts 12*a*3 and 12*b*3, respectively mounted between oscillators 10*a* and 10*b* on links 14*a* and 14*b*, separates those oscillators when a relay 12*a* or 12*b* is at rest, so as to allow the operable peripheral item to operate, whatever is the reason of the failure affecting the other one and, in particular, in case of wrong operation of the concerned peripheral item oscillator.

Therefore, when a peripheral item relay 12 no longer receives pulses due to a failure in the associated computer, that relay is reset and, through its contacts at rest, such as contacts 12*a*1 and 12*a*3 for relay 12*a*, it avoids blocking the associated duplicated peripheral item.

Similarly, if a peripheral item is operating with failure that is recognized in the associated computer, this computer stops sending holding pulses, and the concerned relay 12 is reset leaves and the other peripheral item free to operate.

Any incident concerning the control circuit of a relay 12 results in resetting the relay due to the structure of the conventional-type relay control circuit.

During operation, any request-to-work delivered from a computer to a peripheral item is received in the peripheral interface, such as interface 16*a*, which sends back a receipt acknowledgment signal involving the peripheral item, seizure flip-flop condition, such as flip-flop 7*a*. Such a condition is provided from the flip-flop via links, such as links 20*a* and 19*a* for flip-flop 7*a*, and an OR gate 18*a*. That prevents unuseful operations in case that the called peripheral item is busy.

For ensuring safety, in the case of reset of a relay 12, the corresponding OR gate 18 is suitably supplied through a break-contact of the relay, such as contact 12*a*2 for relay 12*a*, so that that OR gate 18*a* delivers a busy signal identical to the preceding one to the computer which operates accordingly.

In an alternative embodiment according to this invention, two safety circuits identical to those previously described, such as circuits 5*a* and 5*b*, may be assigned directly to a chain computer so as to settle basic function exclusion problem between the two computers.

For instance, in a telephone exchange, the two computers cannot simultaneously, without precaution, perform a path search in memory or select a trunk circuit among all those which can perform a predetermined function, without the risk of selection of the same path or the same trunk circuit, which cannot be admitted.

In this case, two safety circuits, interconnected identical to those described in conjunction with FIG. 2, are each assigned to a computer for the selected basic function, for example, for an in-memory path search.

Each computer operates as previously described in conjunction with FIG. 2 for getting access to the program corresponding with that basic function and it may only get the program when simultaneously seizure circuit, such as flip-flop 7*a*, control circuit, and as AND gate 11*a*, safety switch, such as link 15*a*, are correctly activated. In such a case, a different control arrangement is substituted for circuit 9*a* to allow the computer access to the program corresponding to the basic function for which the group of two interconnected devices has been designed. In the case of simultaneous access request, such an access is given to the priority computer in conditions identical to those previously described. In the case of failure or fault in one of the computers, the access is only given to the computer which remains operative.

While the principles of the present invention have hereabove been described in conjunction with particular embodiments, it will be clearly understood that the description has only been made by way of example and does not limit the scope of this invention.

What is claimed is:

1. A safety arrangement of controlling access from duplicated units to a commonly controlled equipment in a system controlled by duplicated chains, each of said chains including half of said duplicated units among which is included a computer that manages said system operation directly and in relation with the other of said chains, said safety arrangement comprising a pair of interconnected safety circuits, each of said safety circuits being associated with a different one of said duplicated units and including a seizure bistable circuit coupled to and responding to an associated one of said computers to take control of said commonly controlled equipments;

a priority arrangement having

1. an oscillator connected to and synchronized in phase opposition to the oscillator of the other of said safety circuits, and and AND circuit having a first input coupled to the "1" output of said seizure bistable circuit, a second input coupled to the output of said oscillator and a third input;

an operation bistable circuit having its "1" input coupled by means of an inverter to said third input of said AND circuit of the other of said safety circuits to prevent, when said operation bistable circuit is operative, the other of said safety circuits from having access to said commonly controlled equipment by inhibiting the operation of said AND gate of the other of said safety circuits.

2. An arrangement according to claim 1, wherein each of said safety circuits further includes a monostable safety switch coupled to the associated one of said computers, said safety switch having an operation period t and is made operative cyclically with a period T < *t* such that the link from one of said operation bistable circuits to said third input of said AND gate of the other of said safety circuits is broken and the link between said oscillator in one of said safety circuits and said oscillator in the other of said safety circuits is broken when activation pulses are missing from said third input of said AND gate of the other of said safety circuits for a time interval longer than t.

3. An arrangement according to claim 2, wherein each of said safety switches includes a delayed-reset relay.

4. An arrangement according to claim 2, wherein each of said safety switches includes means for indicating the operating condition of the associated one of said safety switches to the associated one of said computers.

5. An arrangement according to claim 2, wherein each of said safety circuits further includes a control arrangement having its input coupled to the "1" output of said operation bistable circuit and its output connected to the reset input of said operation bistable cicuit and the reset input of said seizure bistable circuit to control the reset of said operation bistable circuit and said seizure bistable circuit.

6. An arrangement according to claim 5, wherein each of said control arrangements includes a sequence time circuit to control the sequence of said reset of the associated one of said duplicated units.

* * * * *